Patented Jan. 7, 1930

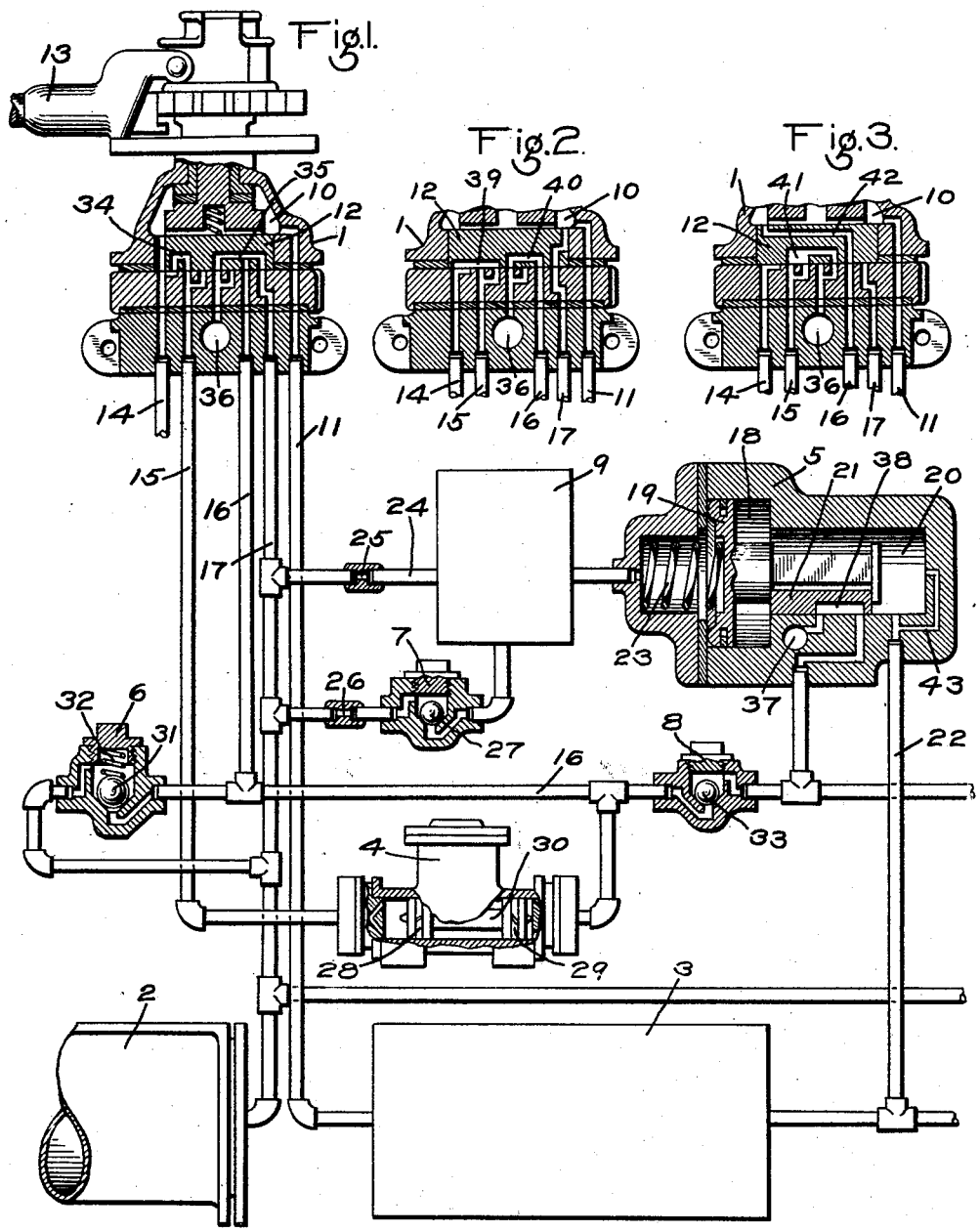

1,742,407

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

DOOR-CONTROL DEVICE

Application filed May 19, 1928. Serial No. 278,994.

This invention relates to car door and brake controlling devices, and more particularly to an equipment in which the operation of the car doors is interlocked with the operation of the brakes.

One object of my invention is to provide a car door and brake controlling equipment in which the car must be brought substantially to a stop before the car doors can be opened.

Another object of my invention is to provide a car door and brake controlling equipment in which the car doors can only be opened after the brakes have been applied for a predetermined period of time.

Other objects and advantages will appear in the following more detailed description of the invention.

In the accompanying drawing; Fig. 1 is a diagrammatic view, partly in section, of a car door and brake controlling equipment embodying my invention; Fig. 2 a sectional view of the brake valve device, showing the rotary valve in position for applying the brakes while holding the car doors closed; and Fig. 3 a sectional view of the brake valve device, showing the rotary valve in position for opening the car doors.

As shown in the drawing, the equipment may comprise a brake valve device 1, a brake cylinder 2, a main reservoir 3, a door engine 4, a relay valve device 5, a limiting valve device 6, a check valve device 7, a check valve device 8, and a timing reservoir 9.

If the equipment is of the double end type, the parts 1, 4, 6, and 8 are duplicated at the other end of the car and are connected up in the manner shown in the drawing.

The brake valve device 1 may comprise a casing having a valve chamber 10 connected by pipe 11 to the main reservoir 3 and containing a rotary valve 12 adapted to be operated by a handle 13. Leading to the seat of the rotary valve are the emergency brake pipe 14, door closing pipe 15, door opening pipe 16, and straight air pipe 17.

The relay valve device 5 may comprise a casing having a piston chamber 18, containing a piston 19 and a valve chamber 20, containing a slide valve 21 adapted to be operated by piston 19. The piston is subject on one side to main reservoir pressure as supplied through pipe 22 to valve chamber 20 and on the opposite side to the pressure of a spring 23.

The spring side of piston 19 is connected to the timing reservoir 9 and said reservoir is connected through pipe 24 with the straight air pipe 17, the pipe 24 having an interposed choke provided with a restricted passage 25. The timing reservoir 9 is also connected to the straight air pipe 17 through a pipe having an interposed choke provided with a restricted passage 26 and having the check valve device 7 disposed therein, said check valve device containing a ball check 27 for preventing flow from the straight air pipe 17 to the reservoir.

The door engine 4 may be of the usual type having a piston cylinder containing pistons 28 and 29 connected together by a stem 30. The movement of the pistons to the right hand position, as shown in the drawing, is adapted to operate mechanism (not shown) for effecting the closure of the car door, and movement of the pistons to the left is adapted to effect the opening of the car door.

The pressure limiting valve device 6 comprises a casing containing a check valve 31, subject to the pressure of a spring 32, for limiting the pressure of fluid supplied to the brake cylinder 2, through the door opening pipe 16.

The door opening pipe 16 leads to the seat of slide valve 21 and the check valve device 8 is interposed in said pipe between the door engine 4 and the relay valve device 5, said check valve device containing a ball check valve 33.

In the release position of the brake valve device, as shown in Fig. 1, the emergency brake pipe, which is normally charged with fluid under pressure, is connected through cavity 34 in the rotary valve 12 with the door closing pipe 15 and the door opening pipe 16 is connected through cavity 35 with an atmospheric exhaust port 36, so that the fluid pressure supplied through pipe 15 to piston 28 maintains the pistons 28 and 29 in the door closing position.

The straight air pipe 17 is also connected through cavity 35 to the exhaust port 36, so that the brake cylinder 2 is at atmospheric pressure. The timing reservoir 9, as well as the spring side of piston 19, is also maintained at atmospheric pressure, so that the main reservoir pressure in valve chamber 20 maintains piston 19 in its left hand position, as shown in the drawing, in which pipe 16 is connected to exhaust port 37, through cavity 38.

If the operator wishes to apply the brakes, so as to stop the car, he moves the brake valve handle to service position, doors closed, in which the rotary valve assumes the position shown in Fig. 2.

In this position, the emergency brake pipe 14 remains connected, through cavity 39 with the door closing pipe 15, while the door opening pipe 16 remains connected to exhaust port 36, through cavity 40 in the rotary valve. The door engine is therefore maintained in the door closing position.

In this position of the brake valve, a port 41 through the rotary valve, connects valve chamber 10 with the straight air pipe 17, so that fluid under pressure is supplied through pipe 17 to the brake cylinder 2. Fluid under pressure also flows through pipe 24 to the timing reservoir 9 and after a predetermined time, as determined by the size of the restricted passage 26, and preferably such as to ensure that the car will be brought substantially to a stop, the pressure in said reservoir and acting on the spring side of piston 19 will be built up to a degree, such that with the aid of the spring 23, the piston 19 will be shifted to the right, cutting off communication from pipe 16 to exhaust port 37 and connecting the pipe 22 with the pipe 16, so that fluid under pressure is supplied to the pipe 16 to hold the check valve 23 seated.

After this occurs, the operator may effect the opening of the car doors, by moving the brake valve handle 13 to the door opening position, in which the rotary valve 12 assumes the position shown in Fig. 3. In this position, the door closing pipe 15 is connected through cavity 44 in the rotary valve with exhaust port 36, while the door opening pipe 16 is connected through port 42 with valve chamber 10.

Fluid under pressure is thus supplied to piston 29 of the door engine, while piston 28 is subjected to atmospheric pressure, and consequently the pistons 29 and 28 are shifted to the left, so as to operate the mechanism for effecting the opening of the car doors.

In the door opening position of the brake valve device, the straight air pipe 17 is blanked, so that fluid under pressure is not supplied from the brake valve device to the brake cylinder. Fluid under pressure, however, supplied to the door opening pipe 16, as above described, can flow to the brake cylinder 2, past the limiting valve 31, until the brake cylinder pressure has been increased to a degree such that the spring 32 will operate to seat the valve 31, when further flow of fluid to the brake cylinder will be prevented.

If it is attempted to open the car doors before the valve 21 has been shifted to its right hand position, fluid under pressure, supplied to the door opening pipe 16 will be vented past the check valve 33 and through cavity 38 in the valve 21 to exhaust port 37, so that the pressure cannot be built up on the piston 29, to effect the movement of the pistons 29 and 28 to the door opening position.

While the slide valve 21 is in its right hand position, the pressure in valve chamber 20 is maintained through a by-pass passage 43.

When fluid under pressure is exhausted from the straight air pipe 17 by operation of the brake valve device in order to release the brakes, fluid is vented from the timing reservoir 9 through the restricted passage 25 and also through the restricted passage 26.

As the flow of fluid from the timing reservoir 9 to the straight air pipe 17 is restricted by flow through the restricted passages 25 and 26, the operator can graduate the release of the brakes in bringing the car to a stop, without reducing the pressure in the timing reservoir sufficiently to permit the movement of the relay piston 19 back to its left hand position. Consequently the piston 19 will hold the valve 21 in its right hand position for permitting the car doors to be opened as soon as the car has been brought to a stop.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a car door and brake controlling apparatus, the combination with a door engine for controlling the opening and closing of a car door and means for effecting an application of the brakes, a valve device having a position in which the operation of the door engine to effect the opening of a car door is prevented, and a timing reservoir adapted to be charged with fluid under pressure at a predetermined rate when the brakes are applied, said valve device being moved to a position for permitting the door engine to operate to effect the opening of a car door, upon a predetermined increase in pressure in said timing reservoir.

2. In a car door and brake controlling apparatus, the combination with a door engine for controlling the opening and closing of a car door, a brake cylinder, and means for supplying fluid under pressure to said brake cylinder, of a timing reservoir, a valve device having a position in which the operation of the door engine to effect the opening of a car door is prevented and movable from said position upon a predetermined increase in fluid pressure in said timing reservoir, and means for charging said reservoir with fluid under pressure at a predetermined rate when the brakes are applied.

3. In a car door and brake controlling apparatus, the combination with a brake cylinder, and a door engine for controlling the opening and closing of a car door and being operated by fluid under pressure for causing the door engine to effect the opening of a car door, of a valve device normally in a position for connecting said door engine to the atmosphere and movable from said position by fluid under pressure as supplied to the brake cylinder.

4. In a car door and brake controlling apparatus, the combination with a brake cylinder, and a door engine for controlling the opening and closing of a car door and being operated by fluid under pressure for causing the door engine to effect the opening of a car door, of a timing reservoir adapted to be charged with fluid under pressure as supplied to the brake cylinder and a valve device normally in a position for connecting said door engine to the atmosphere and movable from said position upon a predetermined increase in pressure in said timing reservoir.

5. In a car door and brake controlling apparatus, the combination with a door engine for controlling the opening and closing of a car door, of a timing reservoir, a valve device controlled by the pressure in said reservoir for controlling the operation of said door engine, a restricted port through which said reservoir is charged with fluid under pressure, a restricted port through which fluid is vented from said reservoir, and a check valve for preventing the supply of fluid under pressure to said reservoir through the last named port.

In testimony whereof I have hereunto set my hand this 16th day of May, 1928.

JOSEPH C. McCUNE.